(12) United States Patent
Harris et al.

(10) Patent No.: US 11,420,692 B2
(45) Date of Patent: Aug. 23, 2022

(54) SURFACE WAVE DETECTION OF SURFACE DEFECTS

(71) Applicant: Invert Robotics Limited, Christchurch (NZ)

(72) Inventors: Paul David Harris, Lower Hutt (NZ); Andrew William Taylor, Christchurch (NZ)

(73) Assignee: Invert Robotics Limited, Christchurch (NZ)

( * ) Notice: Subject to any disclaimer, the term of this patent is extended or adjusted under 35 U.S.C. 154(b) by 971 days.

(21) Appl. No.: 16/084,288

(22) PCT Filed: Mar. 20, 2017

(86) PCT No.: PCT/IB2017/051587
§ 371 (c)(1),
(2) Date: Sep. 12, 2018

(87) PCT Pub. No.: WO2017/158578
PCT Pub. Date: Sep. 21, 2017

(65) Prior Publication Data
US 2019/0077472 A1  Mar. 14, 2019

(51) Int. Cl.
*B62D 55/075* (2006.01)
*B62D 57/024* (2006.01)
(Continued)

(52) U.S. Cl.
CPC ......... *B62D 55/075* (2013.01); *B62D 57/024* (2013.01); *G01N 29/225* (2013.01);
(Continued)

(58) Field of Classification Search
CPC .. B62D 55/075; B62D 57/024; G01N 29/225; G01N 29/265; G01N 29/348; G01N 2291/267; G01N 2291/0423
See application file for complete search history.

(56) References Cited

U.S. PATENT DOCUMENTS 4,162,635 A     7/1979  Triplett et al.
5,446,445 A  *  8/1995  Bloomfield ............ G08B 25/10
                                                340/521
(Continued)

FOREIGN PATENT DOCUMENTS

JP      07-333201 A    12/1995
JP      2012-98193 A    5/2012
(Continued)

OTHER PUBLICATIONS

Leon-Rodriguez et al., "A Compact Wall-Climbing and Surface Adaptation Robot for Non-Destructive Testing," Proceedings of the 12th International Conference on Control, Automation and Systems (ICCAS), Oct. 17-21, Jeju Island, South Korea. 404-9 (2012).
(Continued)

*Primary Examiner* — Natalie Huls
*Assistant Examiner* — Sharad Timilsina
(74) *Attorney, Agent, or Firm* — Clark & Elbing LLP

(57) ABSTRACT

A moving robot has at least one surface wave transducer or a transmitter and receiver, to identify defects on or in a surface on which the robot moves, and provide data indicative of the location, size and/or orientation of the defects from robot position data.

16 Claims, 8 Drawing Sheets

(51) Int. Cl.
G01N 29/265 (2006.01)
G01N 29/22 (2006.01)
G01N 29/34 (2006.01)

(52) U.S. Cl.
CPC ......... *G01N 29/265* (2013.01); *G01N 29/348* (2013.01); *G01N 2291/0423* (2013.01); *G01N 2291/267* (2013.01)

(56) References Cited

U.S. PATENT DOCUMENTS

| | | | | |
|---|---|---|---|---|
| 5,551,525 | A * | 9/1996 | Pack | B62D 57/024 180/8.6 |
| 5,767,408 | A | 6/1998 | Lindgren et al. | |
| 7,520,356 | B2 * | 4/2009 | Sadegh | B62D 53/00 180/164 |
| 7,779,694 | B2 * | 8/2010 | Iizuka | G01N 29/221 73/624 |
| 2014/0156067 | A1 * | 6/2014 | An | G01N 29/2412 700/245 |
| 2014/0216836 | A1 | 8/2014 | Davies et al. | |
| 2014/0230556 | A1 * | 8/2014 | Yamamoto | G01N 29/4427 73/602 |
| 2015/0153312 | A1 * | 6/2015 | Gonzalez | B60B 19/003 901/44 |
| 2015/0192412 | A1 * | 7/2015 | Ozeki | G01N 29/043 73/627 |

FOREIGN PATENT DOCUMENTS

| | | | |
|---|---|---|---|
| JP | 2012098193 | * | 5/2012 |
| WO | WO-2013/048263 A1 | | 4/2013 |

OTHER PUBLICATIONS

International Preliminary Report on Patentability for International Patent Application No. PCT/IB2017/051587, dated Feb. 14, 2018 (15 pages).
International Search Report and Written Opinion for International Patent Application No. PCT/IB2017/051587, dated Jun. 8, 2017 (9 pages).
Dobie et al., "A Noncontact Ultrasonic Platform for Structural Inspection," IEEE Sensors J. 11(10):2458-68 (2011).
European Examination Report for European Patent Application No. 17765969.5, dated Apr. 13, 2021 (5 pages).
Extended European Search Report for European Patent Application No. 17765969.5, dated Nov. 4, 2019 (9 pages).
La et al., "Autonomous Robotic System for Bridge Deck Data Collection and Analysis," International Conference on Intelligent Robots and Systems. 1950-55 (2014).

* cited by examiner

SURFACE WAVE DETECTION OF SURFACE DEFECTS

FIELD

This invention relates to the field of non-destructive testing. More particularly the invention relates to the detection and characterisation of surface breaking defects within for example thin walled structures such as storage tanks and pressure vessels including for example powder dryers, and aircraft fuselages, or other thin walled load bearing structures for example monocoque structures or elements.

BACKGROUND

Owners and/or operators of large thin walled structures often require assurance that the surfaces of their assets are free from surface breaking defects such as fine surface breaking cracks for example. Such defects can harbour bacteria in food processing equipment, contaminants in chemical or pharmaceutical equipment, or ignition sources in high temperature processing equipment, for example. Even very small surface cracks or defects, which may be almost invisible to the naked eye, can harbour bacteria in food processing equipment for example, and lead to food contamination.

Existing techniques for identification of these defects include naked eye and assisted visual methods, dye penetrant techniques, and eddy current devices. Such devices usually probe the structure normal to its surface, and are expensive due to the need for instance to use an array of eddy current devices to cover the scan zone. Furthermore buried cracks or reverse face cracks or structures welded to the reverse face can be sensed though they are not a bacterial contamination risk. Manual inspection for cracks or defects is challenging in for example large industrial hardware such as high on the interior walls of tanks, vats, or dryers used in food processing for example.

Load bearing thin walled structures such as aircraft fuselages for example or monocoque structures or elements, require periodic or post-event checking for defects, including cracking or micro cracking.

SUMMARY OF INVENTION

In broad terms the invention in one aspect comprises a moving robot comprising at least one surface wave transducer or a transmitter and receiver, to identify defects on the surface of a material along which the robot moves.

In broad terms the invention in one aspect comprises a moving robot comprising at least one surface wave transducer or a transmitter and receiver, to identify defects on the surface of a material along which the robot moves, and provide data indicative of the location, size and/or orientation of the defects from robot position data.

In broad terms the invention in one aspect comprises a moving robot comprising at least one surface wave transducer or a transmitter and receiver, to identify defects on or in a surface on which the robot moves, the transducer or transmitter and receiver able to transmit and receive surface waves at multiple frequencies in order to determine the depth of defects on the surface of a material.

In broad terms the invention in one aspect comprises a moving robot comprising at least one surface wave transducer or a transmitter and receiver system, to identify defects on or in a surface on which the robot moves, comprising a combination of:

at least one pulse-echo transducer or transmitter and receiver, and at least one transmit mode transmitter and receiver.

In at least some embodiments the robot carries multiple transducers or transmitters and receivers. In at least some embodiments the transducer(s) or transmitter(s) and receiver(s) is/are incorporated in one or more wheels, rollers, or tracks.

In broad terms the invention in one aspect comprises a moving robot comprising at least one surface wave transducer or a transmitter and receiver, to identify defects on or in a surface on which the robot moves, the transducer or transmitter and receiver incorporated in one or more robotic wheels, rollers, or tracks which are configured to transmit and/or receive surface waves into a material.

In at least some embodiments the robot also has an articulating carriage carrying said one or more wheels, rollers, or tracks. In at least some embodiments the carriage comprises an arm pivotally attached to the robot. In at least some embodiments the arm is biased towards the surface to apply force onto the one or more wheels, rollers, or tracks against the surface. In at least some embodiments the arm carries the one or more robotic wheels, rollers, or tracks via a sub-assembly pivotally mounted to the outer end of the arm.

In at least some embodiments the moving robot is a climbing robot.

In at least some embodiments the robot has one or more suction devices arranged to initially move towards the surface to expel air from between the suction devices and the surface, and then away from the surface without breaking the suction devices from the surface to create a vacuum between the suction devices and the surface effective to hold the robot on the surface.

In at least some embodiments the robot has a drive system arranged to move the robot on the surface causing sliding of the suction devices on the surface while maintaining a vacuum to hold the robot attached to the surface.

In at least some embodiments the robot is arranged to provide data indicative of location of a surface defect. In at least some embodiments the robot is arranged to provide data indicative of any one or more of the location, orientation, depth, and size of a surface defect.

In broad terms the invention in one aspect comprises a wall climbing robot comprising:
- a chassis,
- one or more wheels, rollers, or tracks carried by the chassis,
- one or more suction devices carried by the chassis and an actuator or actuators arranged to initially move the one or more suction devices towards the wall to expel air from between the suction devices and the wall, and then away from the wall without breaking the suction devices from the wall to create a vacuum between the suction devices and the wall effective to hold the robot on the wall,
- a drive system on-board the robot and arranged to move the robot on the wall causing sliding of the suction devices on the wall while maintaining a vacuum to hold the robot attached to the wall,
- at least one surface wave transducer or a transmitter and receiver carried by the chassis to identify defects on the wall, and
- a system associated with the robot for providing data indicative of the location of defects.

In at least some embodiments the transducer(s) or transmitter(s) and receiver(s) is/are incorporated in one or more wheels, rollers, or tracks. In at least some embodiments the transducer(s) or transmitter(s) and receiver(s) is/are incorporated in one or more wheels, rollers, or tracks carried by an arm or arms of the chassis pivotally attached to the robot for movement about a first axis. In at least some embodiments the one or more robotic wheels, rollers, or tracks are carried at an outer end of the arm or arms for movement about a different, second axis.

In this specification:

'surface waves' includes but is not limited to Rayleigh waves. For the purposes of this specification 'surface waves' means acoustic waves that generally propagate in the surface of a solid to within a depth of about one wavelength beneath the surface, or at maximum two wavelengths. When encountering a discontinuity in a surface, surface waves such as Rayleigh waves will be at least partially reflected. Because these waves generally propagate in the surface of a solid to within about one wavelength, or at maximum two wavelengths beneath the surface they are not sensitive to discontinuities appearing deeply beneath the surface. By detecting at least partially the successful transmission of surface waves such as Rayleigh waves across a test area, the absence of surface breaking defects can be determined. By detecting at least partially the reflected surface waves such as Rayleigh waves pulse(s) at the origin the presence of surface breaking defects can be determined and by measuring the transmission time of the pulse(s), further details such as the distance to the surface breaking defects can also be calculated.

'defects' includes cracks, cuts, and pits, holes, edges, and discontinuities.

'vacuum' includes relative vacuum ie pressure lower than pressure surrounding the relative vacuum.

'comprising' means 'consisting at least in part of'. When interpreting a statement in this specification and claims that includes 'comprising', features other than that or those prefaced by the term may also be present. Related terms such as 'comprise' and 'comprises' are to be interpreted similarly.

BRIEF DESCRIPTION OF DRAWINGS

The invention is further described with reference to the accompanying figures which show embodiments of the invention by way of example, and in which.

DETAILED DESCRIPTION OF EMBODIMENTS

Robot

Figure 1:
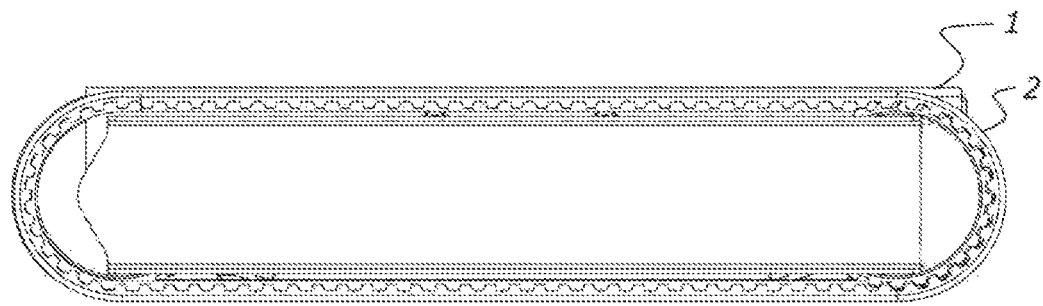
FIG. 1 is a side elevation view from outside of the track of an embodiment of a tracked wall climbing robot.
Figure 2:
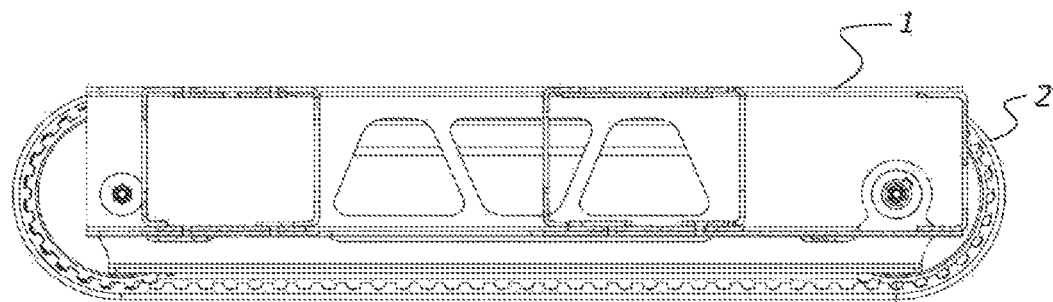
FIG. 2 is a cross-section view of the wall climbing robot of FIG. 1 along line I-I of FIG. 3, looking toward a track unit.
Figure 3:
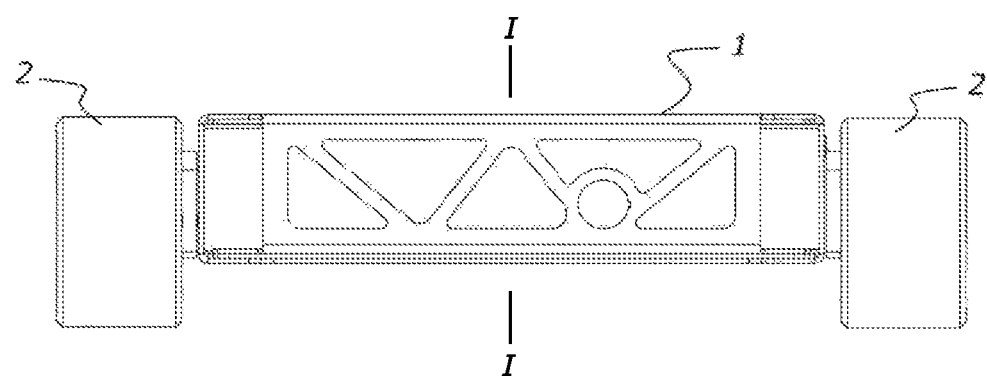
FIG. 3 is a front elevation view of the wall climbing robot of FIGS. 1 and 2.
Figure 4:
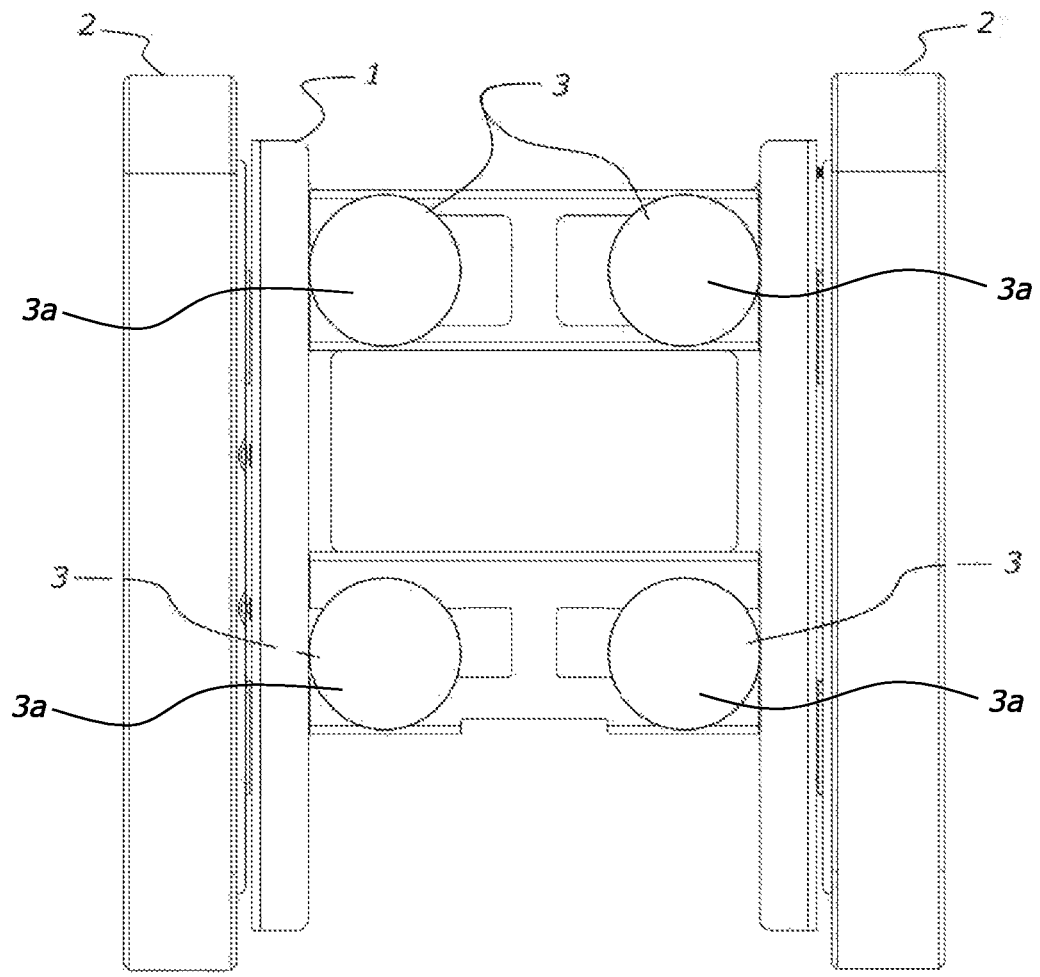
FIG. 4 is a schematic plan view of the wall climbing robot of FIGS. 1 to 3.

Typically an industrial robot used in the detection system of the invention comprises a passive vacuum based adhesion mechanism that is designed to adhere the robot to a surface on which the robot moves, such as an inclined or inverted surface which the robot climbs, while maintaining vacuum, and a drive system arranged to move the robot on the surface, such as move the robot to climb an inclined or inverted surface, during which movement the adhesion mechanism remains adhered to but slides on the surface. A wall climbing robot is described in our international patent application publication WO2013/048263, the entire content of which is incorporated herein by reference. A robot used in the detection system of the invention may comprise an alternative adhesion mechanism for attaching the robot to a surface, such as an active vacuum system (comprising a remote vacuum pump—vacuum from which is coupled to a vacuum based adhesion system of the robot by a vacuum line), and a drive system, and the robot may not be intended to attach to and move on an inclined or inverted surface, but may be arranged to simply move on a horizontal or approximately horizontal surface for example, or on the exterior or interior surface of a cylindrical or approximately cylindrical element such as an aircraft fuselage, or an any complex curved surface such as an aircraft wing, or on a non-curved complex surface.

FIGS. 1 to 4 depict an embodiment of a wall climbing robot. By 'climbing robot' or 'wall climbing robot' is meant a robot which may move on a non-horizontal surface such as a vertical but alternatively an inclined surface for example, and/or on the exterior or interior surface of a cylindrical or approximately cylindrical element as referred to above. The robot has a chassis 1 which carries a pair of driven tracks 2. Each track is each driven by an on board electric motor or motors (not shown). In an alternative embodiment the chassis 1 carries wheels or rollers.

In the embodiment shown, multiple suction mechanisms comprise multiple suction pads or cups 3 carried by the chassis 1 and including deformable concave surfaces 3a exposed on the underside of the robot which adhere the robot to the surface on which the robot moves, while the drive system moves the robot on the surface, during which movement the cups 3 remain adhered to but slide on the surface, holding the robot on the surface as it moves. An associated control system enables the robot to be driven and steered on the surface, under control of an operator, or according to a pre-programmed test regime for example. In the embodiment shown suction cups 3 are mounted to the chassis 1 via individual actuators (not shown) arranged to initially move the cups 3 towards the surface to expel air from between the cup and the surface, and then away from the surface without breaking the cup from the surface to create a vacuum between the cup and the surface effective to hold or assist holding the robot on the surface. One form of actuator has actuation rods and springs and cams driven by servo motors for example. Specifically, actuators move the suction pads toward the climbing surface by exerting a first force upon the suction pads 3 to deform the suction pads 3 such that the air is substantially or at least partially evacuated from beneath the suction pads. The actuators then move the suction pads away from the climbing surface by exerting a second opposite force on the suction pads to pull the suction pads away from the climbing surface such that a seal between the pads and the surface is achieved. The magnitude of the second force applied to the suction pads controls the magnitude of the vacuum and therefore the adhesion force between the suction pads and the climbing wall. A controller may measure the level of the vacuum force generated by the or any suction pad and/or the deformation of the suction pad and alter the second force to an optimum characteristic.

As stated in alternative embodiments a vacuum line may couple vacuum from a remote vacuum pump to the cups 3. In a further alternative embodiment the robot may carry a vacuum pump which may be powered by a line to a remote power source, or by a power source on board the robot.

Electronics on board the robot may include a controller to control the motors, actuators, interface with on-board sensors and communicate with a remote controller, for example wirelessly. In a passive vacuum system as described the controller may be configured to receive or determine information relating to the level of vacuum within the suction pad, and/or the estimated time remaining before vacuum is lost within the pad, for example. For example, the controller may be configured to receive a signal from a sensor that is adapted to measure the vacuum force under each attached suction pad. The controller uses the measured vacuum force to control actuators to re-prime the suction pads when the vacuum drops below a level that may cause the suction pad to detach from the surface.

As stated the suction pads 3 slide against the climbing surface while maintaining a vacuum to keep the robot attached to the surface. Preferably the pads are made from a material which slides against the climbing surface material with minimal friction. The friction force of the suction pads is overcome by the drive system comprising driven tracks 2.

The embodiment shown in the figures comprises four suction mechanisms 3 supported by the chassis 1. Alternatively one, two, three, or more than four suction pads and associated actuators may be provided.

Defect Identification

In accordance with the invention, the robot carries at least one transducer, or at least one transmitter and at least one receiver, to assess and/or identify defects on the surface of a material along which the robot moves. The robot moves along a structure surface, often on sheet weld zones for example, with the transducer or multiple of directional transducers scanning a region for defects, such as on thin walled structures such as storage tanks, pressure vessels, and powder dryers for example, or aircraft fuselages for example or other thin walled load bearing structures for example monocoque structures or elements, to reliably detect surface defects with a profile that may be a risk for future bacterial contamination, or may indicate a structural defect in a thin walled structure. The transducer(s) directionally transmit and receive ultrasound waves typically at one or more frequencies in the frequency range 1 to 10 Mhz but alternatively at a lower or higher frequency, at an angle to a surface such that the resulting ultrasound wave travelling in the thin walled structure is confined to the surface, namely to produce surface waves such as Rayleigh waves.

In for example stainless steel, or other metal, a surface crack or pit or other defect of depth approaching or greater than the wavelength of the surface wave will present a major barrier to the wave and will be reflected. As the acoustic property of the defect (typically air or any other fluid which cannot support waves) is largely different from that of the surface material in which the wave is travelling, even a small defect will give a large reflection. This reflection is sensed and the presence of such defects determined. The system may also have application in surface defect detection in non-metallic materials such as composite materials, for example carbon fibre materials.

A pulse from a transducer will pass through weld areas and weld beads for example providing the materials have a similar acoustic impedance to the surface material to be tested. The pulse will reflect or partially reflect upon encountering any surface breaking discontinuities. The transducer will detect a reflected pulse, indicating the presence of a surface breaking defect. The time between the transmission of the initial pulse from the transducer and the detection of the reflected pulse can be used to calculate the distance to the defect if the speed of the pulse in both the probe and the surface material are known. This is referred to herein as pulse-echo mode.

Two transducers or a transmitter and a receiver can also be used to determine the presence and location of surface defects in a transmit-receive or transmission mode. In this mode a pulse can be transmitted by one transducer on the surface, towards another transducer. The pulse will travel toward the other transducer and the expected arrival time of a pulse can be calculated from a known start time and distance between the transmitter and receiver. Lack of detection of a pulse at an expected time indicates the pulse was reflected away or otherwise blocked. This indicates either a surface breaking defect or a failure to generate a surface wave.

Surface breaking defects often have untidy edges and/or are inclined at a significant angle from transmission angle of the pulses. Normal pulse-echo mode assessments may be compromised by the reflection angle and degree of wave scattering. In some embodiments the robot may carry a small array of broadband transducers so that the transmission and receiving of the waves travelling on the surface has an annular dependence and with this lobe having a frequency related varying lobe width. As the robot travels, the ultrasound signature associated with the angular dependence and lobe width is recorded along with transmission and pulse echo assessment. The invention includes the processing of this data for enhanced surface breaking defect detection and analysis. This acts to counteract the effect that the scattering and large angles have on the receiving of reflected pulses.

Transducer Configurations—Examples

In at least some embodiments the robot carries multiple transducers or transmitters and receivers. In at least some embodiments one transducer or transmitter and receiver is/are arranged at a different angle to at least one other transducer or transmitter and receiver.

Figure 5:
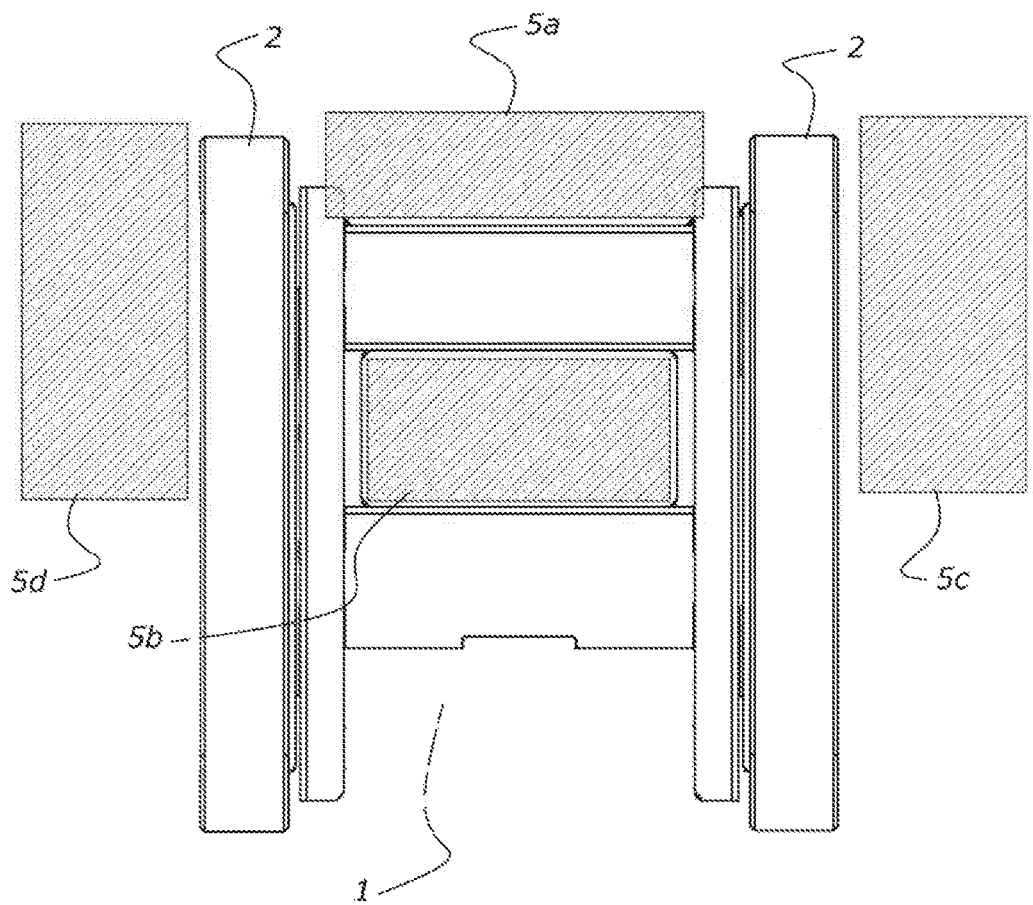
FIG. 5 is a schematic plan view of the wall climbing robot of FIGS. 1 to 4, also showing, as shaded areas, some (but not all) locations where one or more transducers carried by the robot may be positioned when attached to the robot chassis i.e. 'payload' areas of the robot.

FIG. 5 is a schematic plan view of the wall climbing robot of FIGS. 1 to 4, also showing, as shaded areas 5*a-d*, some (but not all) locations where one or more transducers, and optionally other systems, carried by the robot may be positioned when attached to the robot chassis i.e. 'payload' areas of the robot. The robot may also carry other inspection equipment, remote controllers, wireless communication elements, camera and video elements, and/or other sensors, transducers and tools.

Figure 6A:
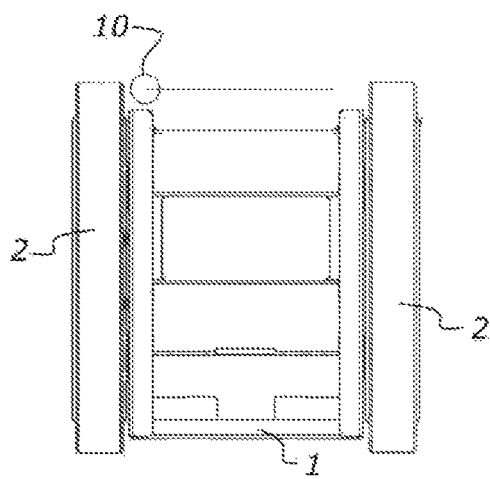
FIG. 6A to 6F schematically show different mounting configurations for transducers on a wall climbing robot.

FIGS. 6A to 6F show different embodiments for mounting transducers on a robot. One or more of these configurations may be used at one time on the robot. FIG. 6A shows a single transducer 10 acting as both a transmitter and receiver in a pulse-echo measurement configuration. The transducer acts to transmit surface waves into the material. These waves are directed from left to right in the figure, between the two tracks (or wheels) at the front (or rear) of the robot. The transducer 10 further acts to receive any incident surface waves reflected by surface defects.

Figure 6B:
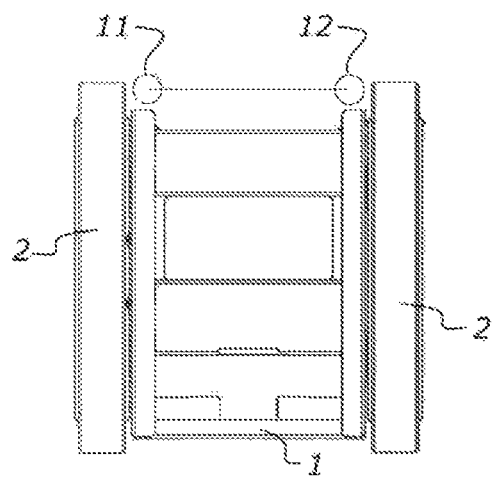

FIG. 6B shows two transducers 11 and 12 directed towards each other and facing the centre of the robot. In one embodiment, each of the transducers acts to both transmit and receive surface waves, for example, the transducer 11 on the left will transmit surface waves directed to the right transducer 12, and the right transducer 12 will receive the waves transmitted in a transmission measurement. The transducer 12 on the right will also act to transmit surface waves directed at the transducer 11 on the left, which receives the waves in a transmission measurement. In another embodiment, the transducers 11 and 12 perform transmission measurements between them as previously described, and will also perform pulse-echo measurements as in the embodiment of FIG. 6A, wherein each transducer will receive back incident surface waves reflected from any surface defects in the material. In further embodiment, each transducer 11 and 12 acts as one of a transmitter or a receiver. For example, the transducer 11 on the left may act as to transmit surface waves directed at the right transducer 12, which will then receive the surface waves in a transmission measurement.

Figure 6C:
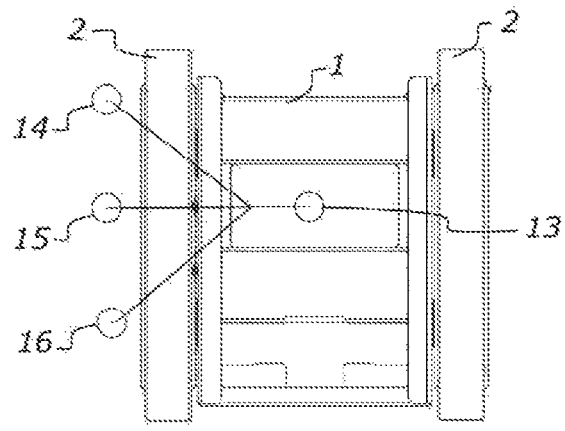

FIG. 6C shows a configuration wherein four transducers 13, 14, 15 and 16 are mounted to the robot. Central transducer 13 and centre left transducer 15 act similarly to the transducers in the embodiment of FIG. 6B (transmission or pulse-echo or both). Transducers 14 and 16 are mounted forward and behind transducer 15 and are angled towards the centre of the robot as shown. This arrangement is merely for illustrative purposes and the placement of each transducer including the distance from each other and the angle of direction for surface waves is variable. Transducers 13 and 16 output surface waves and receive incident surface waves which have been reflected by surface defects in pulse-echo mode, as in the embodiments of FIGS. 6A and 6B. Transducers 14-16 can be mounted on the left or right hand side of the robot, or both.

Figure 6D:
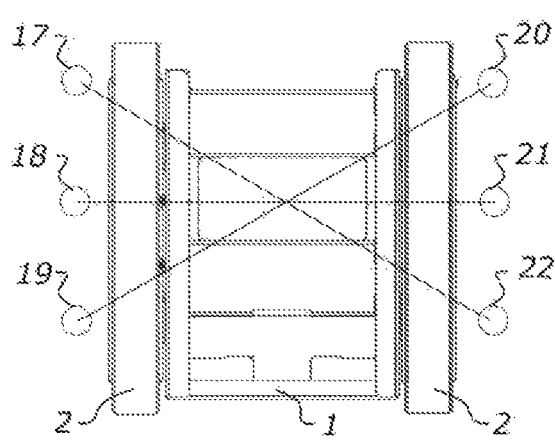

FIG. 6D shows a six transducer configuration wherein three transducers 17, 18, 19, 20, 21 and 22 are carried on either side of the robot and are evenly spaced and angled towards the centre of the robot. Alternatively for example four transducers may be used, one at each corner of the robot, or eight or more transducers may be used, spaced evenly and angled towards the centre of the robot. The transducers act in pairs, for example transducer 17 is arranged to pair with transducer 22 in transmission measurements, and both transducers 17 and 22 may operate in pulse-echo mode also, or vice versa. Transducer pairs 18 and 21, and 19 and 20, are arranged to operate similarly.

Figure 6E:
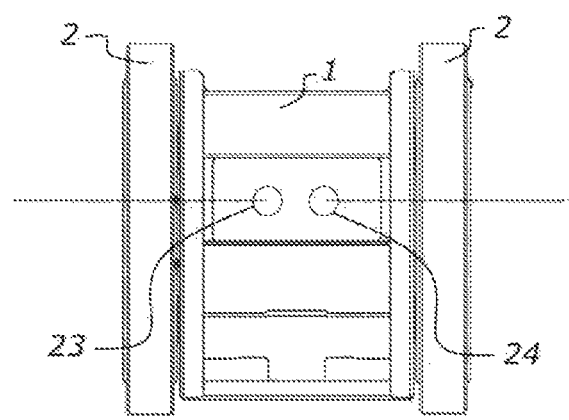

The transducer configuration shown FIG. 6E comprises two outwardly facing transducers 23 and 24 mounted near/at the centre of the robot. Similarly to the arrangement shown in FIG. 6B, these transducers are arranged to operate in transmit mode or pulse-echo mode or both. Surface waves are directed into the material outwardly from the robot, with one directed to the left and one to the right of the robot. The transducers also receive any incident surface waves reflected by surface defects.

Figure 6F:
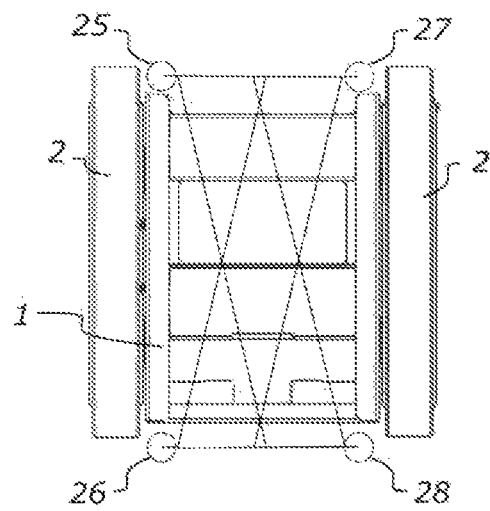

FIG. 6F shows a configuration of four transducers 25, 26, 27 and 28 wherein each transducer has functionality for transmitting and receiving surface waves at different angles. For example, transducer 25 operates as described in the embodiment of FIG. 6B, in transmission mode with transducer 27, as well as performing pulse-echo measurements. These measurements are done on the same angular direction. The transducer 25 will also act to transmit and receive surface waves in pulse-echo mode at an alternative angle, as shown in the figure this is towards the rear of the robot from transducer 25 and 27. It is appreciated that the transducers may transmit and receive surface waves in any number of different directions.

Figure 10:
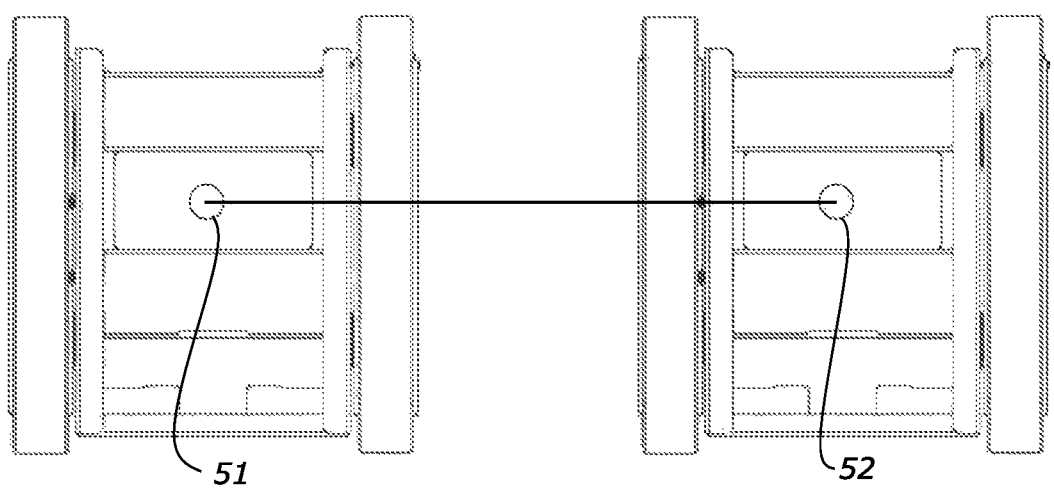
FIG. 10 is a schematic plan view of two wall climbing robots opposed to each other and operating in sync to where one robot transmits and the other robot receives.

In another embodiment as shown in FIG. 10, two or more opposed robots with at least one transducer or at least one transmitter and one receiver operate in conjunction with each other. These two or more robots operate as described previously with surface wave signals being transmitted however one robot functions to transmit surface waves and the other functions to receive said transmitted surface waves. This allows the area being tested between the robots to be increased, which in turn reduces the time taken to inspect the surface of a material. The arrangement of the transducers or at least one transmitter 51 and at least one receiver 52 on the individual robots may have any configuration as described above in relation to FIGS. 6A to 6F, for example the robot may have a number of inward or outward facing transducers which inspect the surface of the material and can operate in transmit or pulse-echo mode, and there may be a number of corresponding receiving transducers on the opposed robot.

As previously discussed in relation to a transmit-receive or transmission mode between two transducers, a pulse can be transmitted from a transducer on one robot and travel toward a transducer on the other robot. The expected arrival time of the pulse can be calculated from a known start time and distance between the transmitter robot and receiver robot. Lack of detection of a pulse at an expected time indicates the pulse was reflected away or otherwise blocked. This indicates a surface breaking defect. A delay in the expected time of arrival of the pulse at the receiver can also indicate defects on the surface of the material, as the defect will slow the propagation of the wave.

It is important for the robots to travel at a constant speed and distance with respect to one another so that surface waves propagating between them are able to be consistently and accurately read and received. The robots are coordinated to move in synchrony with respect to each other either by an external controller which controls each of their motions or through on-board logic on the robots and a communication link between the two robots.

In another embodiment the receiving robot is coordinated to travel at the same speed as the transmitting robot, but slightly behind it. This allows the system to work over long distances, as the propagation delays as the surface wave moves towards the receiving robot could mean that the robot has passed the point of reception for the surface wave. The robots can be coordinated to move with respect to each other on a number of different surfaces, for example horizontally around or vertically up and down the interior of a thin walled structure such as a storage tank and pressure vessel, or similarly around the exterior of an aircraft fuselage, or other thin walled load bearing structures for example monocoque structures or elements.

In some embodiments the robot wheel(s), track(s) or roller(s) make acoustic contact with the surface of the material ie a transducer or set of transducers is contained within one or more wheels, tracks, or rollers of the robot, to transmit and receive ultrasound waves at an angle to the surface of the material such that the resulting ultrasound wave is confined to the surface. This may allow fluid couplants between the surface and a transducer to be avoided.

Figure 9:
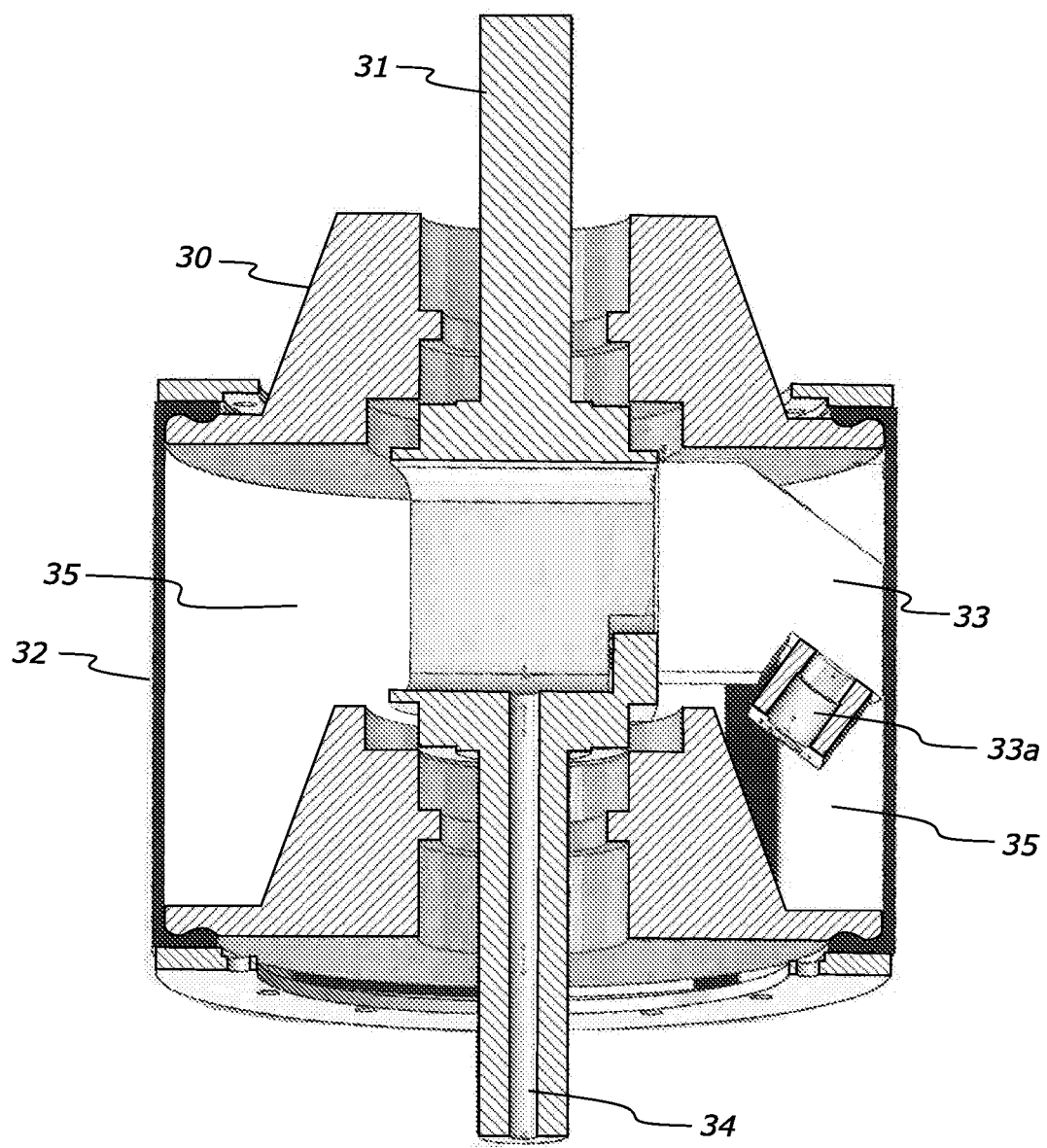
FIG. 9 is a schematic cross-section through a wheel-implemented transducer of an embodiment of a robot of the invention.

FIG. 9 is a schematic cross-section through a wheel-implemented transducer. Hollow wheel hub 30 rotates about wheel axle 31, and carries tyre 32 of a resilient material, which contacts and rolls on the surface to be tested. Within hub 30 a transducer (not shown) is mounted in aperture 33*a* of (non-rotating) mounting 33 to the axle 31. Electrical connection to the transducer is through a duct 34 within the axle 31. The transducer mount 33 and thus transducer is inclined at an angle so as to transmit and receive Rayleigh waves with the test surface on which the robot wheel moves. An interior cavity 35 of the wheel is at least partially filled with a fluid so that there is acoustic coupling from the transducer mounting and the tyre 32. Preferably the fluid inside cavity 35 is under a small internal pressure relative to the external pressure so that the tyre 32 also centrally contacts with the surface to be tested. The tyre material acoustic properties are preferably similar to that of the transducer mount whilst being a material suitable for maintaining an acoustic contact to the surface to be tested.

Sensor Carriage

Figure 7:
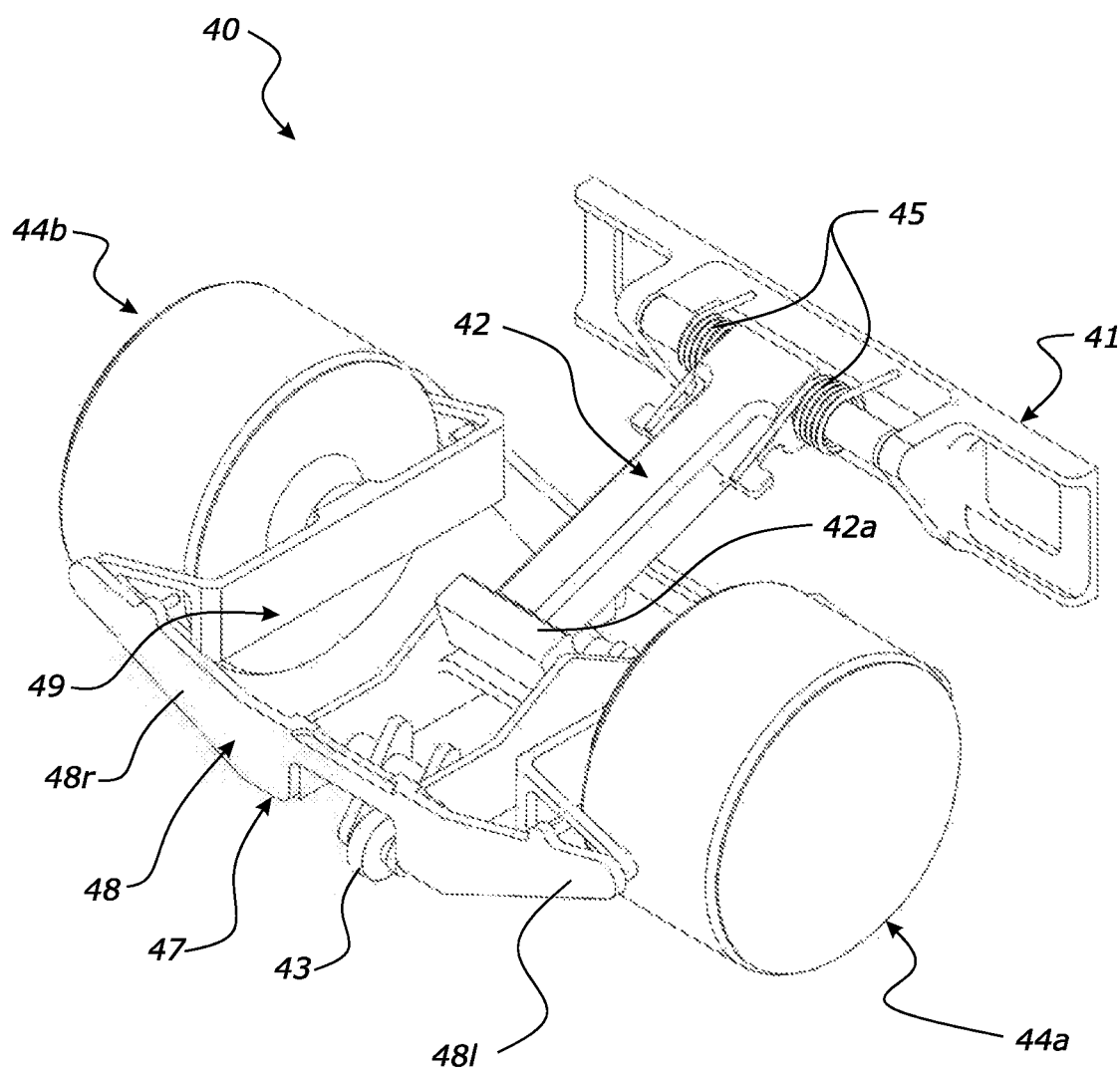
FIG. 7 is a perspective view of a carriage which may attach to the robot of FIGS. 1 to 4 in order to position one or more transducer wheels in contact with the surface of a material.
Figure 8:
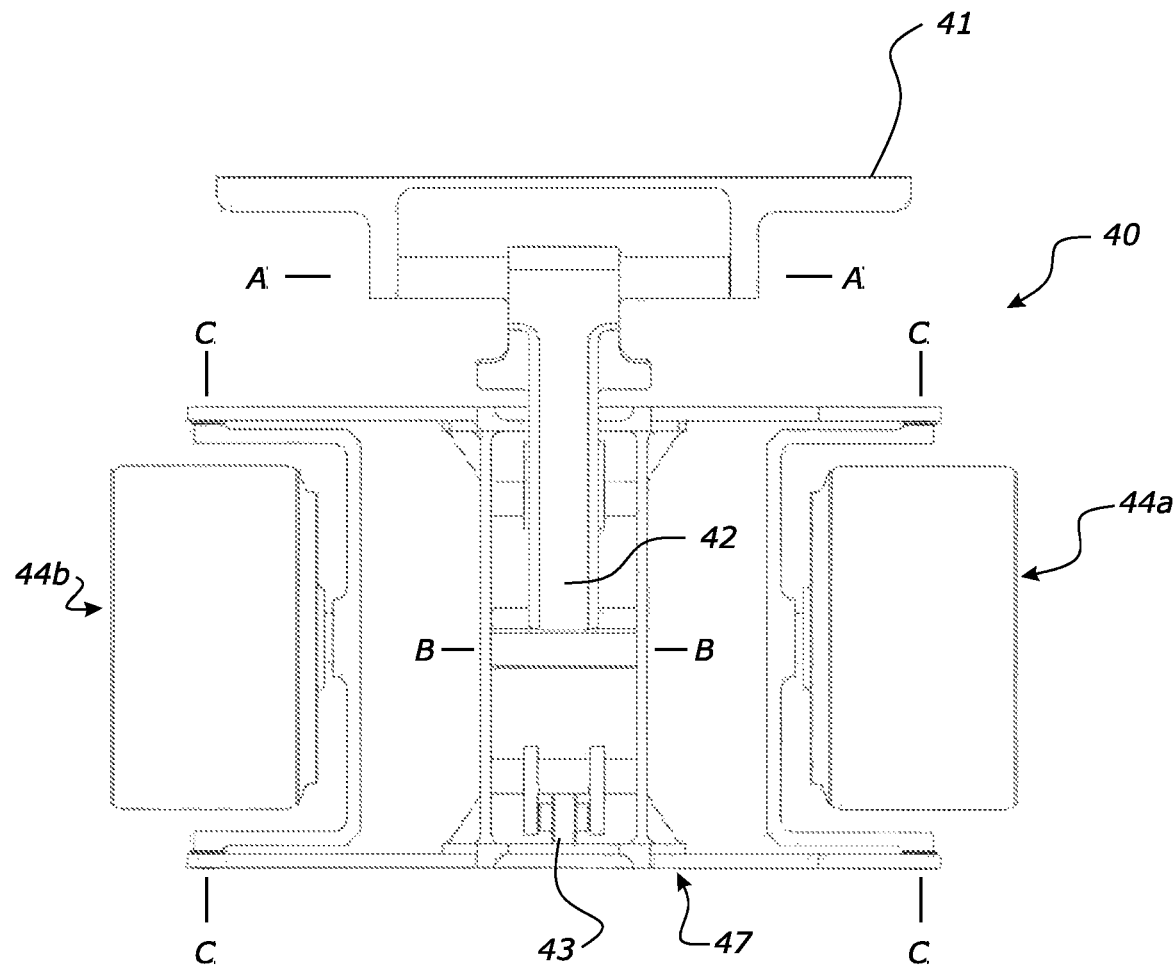
FIG. 8 is a schematic plan view of the carriage of FIG. 7.

FIGS. 7 and 8 show an articulating carriage which may attach to a robot, such as the robot of FIGS. 1 to 4 for example, in order to carry one or more transducer wheels, tracks, or rollers generally as described, in contact with the surface of a material. The articulating carriage ensures that each transducer is always held normal (in a geometric sense) to the surface of a material which is being inspected, which may be a curved surface for example a surface with surface irregularities such as at a junction between two sheets of a material such as a weld seam, as the robot moves over the surface.

The carriage comprises a bracket 41 which attaches to the robot chassis. An arm 42 can pivot about axis A-A (see FIG. 8) and is spring biased by springs 45 towards the surface of the material to apply light force onto the transducer wheels or rollers 43 against the surface. In the embodiment shown the arm 42 carries two transducer wheels but in alternative embodiments the arm or arms may carry one or more than two transducer wheel(s), or transducer tracks.

At its outer end 42*a* the arm 42 carries the transducer wheels 43, via a sub-assembly 47 comprising a subframe 48 pivotally mounted to the outer end of arm 42 about axis B-B. Left and right parts 48l and 48r of subframe 48 each carry one of spring loaded wheels 44*a*, 44*b* via a small swing arm 49 pivotally carried by sub frame for movement about axes C-C. This enables the transducer wheel or wheels 43 remain in constant normal contact with the surface when the robot is moving and the robot does not have the potential to be in a position where it is not parallel to the possibly curved climbing surface. The spring loaded pivot 42 also allows for limited torsional flexibility. In this way the system will naturally rock the carriage to ensure the spring loaded wheels 44*a*, 44*b* have an equal amount of pressure distributed between them which ensures the transducer wheel or wheels remain normal to the curved surface.

Location, Size and/or Orientation of Defects

In another embodiment the robot or robots location is determined in real time as the robot moves. In some embodiments the robot also provides data indicative of the location, size and/or orientation of the defects from robot position data. The robot may also carry one or more sensors which enable it to determine the location of the robot with regard to its environment. For example the robot may comprise wheel encoders to determine location relative to a starting location by way of dead reckoning. The robot may alternatively use a visual, laser or radar based localisation system and algorithms to gather information about its position within its environment. Alternatively, the robot may use mapping algorithms to determine its location. The system may combine location data with the data concerning the location of defects that have been detected in order to indicate the location of defects in the overall environment and to give higher resolution information regarding defects while the robot is in constant motion. Alternatively the robot can have systems which allow it to triangulate its position from reference beacons or other objects placed at known coordinates on the surface to be inspected. The robot or robots are able to determine their location and thus the location of any defects in relation to these local reference points.

Multiple Frequencies

In some embodiments the transducer(s) transmit and receive surface waves at multiple frequencies in order to determine the depth of defects on the surface of a material. The degree to which surface waves probe the depth of the material is frequency related, hence the transducers are able to transmit and receive at multiple frequencies so as to indicate of the defect depth in both transmission and pulse-echo mode assessments. In for example inspection of food processing equipment it is of particular interest that only defects of a certain depth are detected as there is a link between the depth of the defect and its ability to harbour a relevant population of microbes. The depth of the defect is also important because the surface finish can often be rough with large scratches, which are not of concern in regards to harbouring bacteria or contaminants. Therefore an ability to detect a minimum defect depth allows a user to avoid being overwhelmed by false positives given by such scratches. In other contexts, even low depth defects such as cracking can affect the structural integrity of a thin walled load bearing structure such as an aircraft fuselage for example.

Other

In some embodiments movement of the robot or robots may be controlled manually by an operator via a remote control for example. The robot or robots may communicate data in real time to a processor such as a mobile computer eg laptop, which displays scan information graphically for interpretation by the operator. The robot may also carry a camera and for example real time video may be displayed to the operator separately from or combined with other graphical display of processed defect information. The robot or robots alternatively may store gathered data on a storage device or memory unit located on the robot which can be retrieved after the robot has performed an inspection of a surface.

In other embodiments a control system on board the robot or robots or remote from the robot may cause the robot to move over the surface in a predetermined search path or pattern, for example in a grid search around and up and down the internal cylindrical wall of a tank for example. The control system may be arranged to cause the robot after making an initial search over the surface to then return to one or more areas of the surface such as area(s) in which defects have been identified or are likely, to more closely/finely survey these areas. The system may also be arranged to carry out some data analysis or image analysis of the robot-provided data or image stream, for defects or potential defects, and to provide an indication to an operator or to record information on defects and/or defect type and/or defect location. In particular the acoustic signatures, including at one or many frequencies, from one, some, or all of the transducers, and at multiple incremental locations of the moving robot, can be used to detect surface defects. A synthetic aperture type method (using the motion of the transducer(s) over the surface area to provide finer spatial resolution) may be used, additionally utilising the acoustic data for the transducers arranged at an angle and the acoustic data at varying frequencies at multiple incremental robot positions.

The foregoing describes the invention including preferred forms thereof and alterations and modifications as will be obvious to one skilled in the art are intended to be incorporated in the scope hereof as defined in the accompanying claims.

The invention claimed is:

1. A moving robot for identifying defects in a thin wall, the moving robot comprising at least one transducer or a transmitter and receiver pair incorporated in one or more wheels, tracks, or rollers of the robot, the transducer or transmitter arranged to transmit ultrasonic energy into the wall as the robot moves on the wall, the transducer or receiver arranged to receive said energy to identify defects breaking the surface of the wall, wherein the transducer or transmitter is arranged at an angle to a surface of the material along which the robot moves, such that transmitted ultrasonic energy is confined to the surface of the wall and propagates in the wall as surface waves to within a depth of two wavelengths beneath the surface, the transducer or receiver arranged to receive said ultrasonic energy to identify defects breaking the surface of a wall; and an articulating carriage attached to the robot that is configured to carry and hold the one or more wheels, tracks or rollers comprising the at least one transducer or transmitter and receiver pair in contact with and normal to the surface of the wall such that the angle of the transducer or transmitter and receiver pair to the wall is maintained as the robot moves across the surface.

2. The moving robot according to claim 1, arranged to provide data indicative of the location, size and/or orientation of the defects from robot position data.

3. The moving robot according to claim 1, wherein the transducer or transmitter is configured to transmit ultrasonic enemy which propagates in the wall as surface waves at multiple frequencies, in order to determine the depth of defects breaking the surface of a material.

4. The moving robot according to claim 1, wherein the at least one transducer or transmitter and receiver pair, and comprise a combination of:
at least one pulse-echo transducer or transmitter and receiver, and
at least one transmit mode transmitter and receiver.

5. The moving robot according to claim 1, further comprising multiple transducers or transmitters and receivers.

6. The moving robot according to claim 1, wherein the moving robot is a climbing robot.

7. The moving robot according to claim 6, further comprising one or more suction devices arranged to initially move towards the surface to expel air from between the suction devices and the surface, and then away from the surface without breaking the suction devices from the surface to create a vacuum between the suction devices and the surface effective to hold the robot on the surface.

8. The moving robot according to claim 7, further comprising a drive system arranged to move the robot on the surface causing sliding of the suction devices on the surface while maintaining a vacuum to hold the robot attached to the surface.

9. The moving robot according to claim 1, wherein the arm of the articulating carriage is pivotally attached to the robot for movement about a first axis, and wherein the one or more robotic wheels, rollers, or tracks are carried at an outer end of the arm for movement about a different, second axis.

10. The moving robot according to claim 1, wherein the transducer or transmitter is arranged at an angle to the wall such that transmitted ultrasonic energy propagates in the wall as surface waves to within a depth of one wavelength beneath the surface.

11. The moving robot according to claim 1, wherein the articulating carriage further comprises an arm pivotally attached to the robot.

12. The moving robot according to claim 11, wherein the arm is biased towards the surface of the wall to apply force onto the one or more wheels, rollers, or tracks against the surface of the wall.

13. The moving robot according to claim 12, wherein the arm is pivotally attached to the robot by at least one spring loaded pivot which biases the arm towards the surface of the wall.

14. The moving robot according to claim 11, wherein the articulating carriage further comprises a sub-assembly pivotally mounted to the end of the arm distal to the robot, the sub-assembly configured to carry and hold the one or more wheels, tracks or rollers.

15. The moving robot according to claim 14, wherein the one or more wheels, tracks or rollers comprise spring loaded wheels, each carried and held via a swing arm pivotally carried by the sub-assembly.

16. The moving robot according to claim 15, wherein each wheel, roller, or track comprises a hub which rotates about an axle, wherein a transducer or transmitter or receiver is mounted in an aperture of the hub at an inclined angle so as to transmit or receive ultrasonic energy at an angle to the wall to identify defects breaking the surface of the wall.

* * * * *